(12) United States Patent
Kumai et al.

(10) Patent No.: US 6,205,908 B1
(45) Date of Patent: Mar. 27, 2001

(54) PISTON EQUIPPED WITH PISTON RING

(75) Inventors: Teruo Kumai, Nishikamo-gun; Michio Okamoto, Kami-ina, both of (JP)

(73) Assignee: Toyota Jidosha Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/244,847

(22) Filed: Feb. 4, 1999

(30) Foreign Application Priority Data

Feb. 20, 1998 (JP) ................................................. 10-039242

(51) Int. Cl.[7] ............................................................ F01B 31/10
(52) U.S. Cl. ........................... 92/160; 92/194; 92/212; 277/438; 277/440
(58) Field of Search ............................... 92/160, 194, 212, 92/249; 277/437, 438, 440, 491, 562, 584, 946

(56) References Cited

U.S. PATENT DOCUMENTS 3,494,262 * 2/1970 Holcombe ............................. 92/160
3,667,443 * 6/1972 Currie et al. ......................... 92/182

FOREIGN PATENT DOCUMENTS

| 3325015 | 8/1984 | (DE) . |
| 173600 | 3/1986 | (EP) . |
| 2104621 | * 3/1983 | (GB) . |
| 8-226542 | * 9/1996 | (JP) . |
| 9-280373 | 10/1997 | (JP) . |

* cited by examiner

*Primary Examiner*—Edward K. Look
*Assistant Examiner*—Thomas E. Lazo
(74) *Attorney, Agent, or Firm*—Pillsbury Winthrop LLP

(57) ABSTRACT

The present invention aims at reducing the amount of oil consumption in a piston using a piston ring continuously formed of resin without being provided with an abutment. A stepped portion is formed on a third land, which is located below a second ring having a construction wherein an outer ring continuously formed of polyimide without being provided with an abutment is pressed against a cylinder wall by a coil expander via an inner ring continuously formed of PTFE without being provided with an abutment. Oil spill ports are provided so as to allow communication between the stepped portion and an inner wall of the piston.

11 Claims, 1 Drawing Sheet

PISTON EQUIPPED WITH PISTON RING

INCORPORATION BY REFERENCE

The disclosure of Japanese Patent Application No. HEI 10-39242 filed on Feb. 20, 1998 including the specification, drawing and abstract is incorporated herein by reference in its entirety.

BACKGROUND OF THE INVENTION

1. Field of the Invention

The present invention relates to a piston with a ring groove that has fitted thereinto a piston ring structural body wherein a ring continuously formed of resin without being provided with an abutment is pressed radially outwards by a coil expander composed of a metal wire wound like a coil.

2. Description of the Related Art

To reduce the amount of blow-by gas (gas which leak to a crank case through a gap between a piston ring and a cylinder), Japanese Patent Application Laid-Open No. HEI 9-280373 discloses a piston equipped with a piston ring continuously formed of resin without being provided with an abutment. This publication discloses a piston ring structural body wherein an outer ring continuously formed of polytetrafluoroethylene (PTFE) as a fluororesin without being provided with an abutment is pressed radially outwards by a ring tensile force applying member composed of a metal coil expander via an inner ring also continuously formed of PTFE without being provided with an abutment.

In the piston ring structural body disclosed in the aforementioned publication, the ring is divided into the inner and outer rings. While the inner ring ensures sealability around a ring groove, the outer ring ensures sealability between a sliding portion thereof and a cylinder wall.

If the piston ring is provided with an abutment, a small amount of combustion gas leaks out toward a crank case through the abutment. The leaking combustion gas blows down oil which has adhered to the ring groove of the piston and the cylinder wall toward the crank case, whereby the amount of oil consumption is reduced.

However, in the case of a ring made of resin without being provided with an abutment, the aforementioned blow-down effect cannot be obtained. As a result, the oil that has adhered to the ring groove of the piston and the cylinder wall is not returned toward the crank case, and the amount of oil consumption may increase.

SUMMARY OF THE INVENTION

In view of the aforementioned problem, it is an object of the present invention to inhibit, in the piston using a piston ring continuously formed of resin without being provided with an abutment, the amount of oil consumption from increasing due to a phenomenon wherein oil which has adhered to a ring groove of a piston and a cylinder wall is not returned toward a crank case.

A first aspect of the present invention provides a piston including a piston ring structural body, a ring groove and a land portion. The piston ring structural body includes a ring that is continuously formed of resin without being provided with an abutment and slides against a cylinder wall. The piston ring structural body is fitted into the ring groove. The land portion is formed on an outer circumference of the piston on a side of a crank case with respect to the ring groove and at least has a portion more contiguous to the cylinder wall than a bottom portion of the ring groove. In this piston, the land portion has formed therethrough an oil return port that allows communication between a cylinder-side face of the land portion and an inner space of the piston.

In the thus-constructed piston, a surplus of oil, which has reached the cylinder wall at a location on the side of the crank case with respect to the ring that is continuously formed of resin without being provided with an abutment and slides on the cylinder wall, is introduced into the piston through the oil return port formed through the land portion, which is located on the side of the crank case with respect to the ring groove.

In the first aspect of the present invention, the land portion may have an oil transportation mechanism that transports oil which has reached the land portion to the oil return port when the piston moves toward the crank case.

In the thus-constructed piston, a surplus of oil, which has reached the cylinder wall at a location on the side of the crank case with respect to the ring that is continuously formed of resin without being provided with an abutment and slides against the cylinder wall, is transported to the oil return port by the oil transportation mechanism of the land portion, which is located on the side of the crank case with respect to the ring groove. The oil is then introduced into the piston through the oil return port.

In the first aspect of the present invention, the oil transportation mechanism may have a first portion that is formed on the land portion and located nearest to the cylinder wall and a second portion that is formed on the side of the crank case with respect to the first portion of the land portion and located farther from the cylinder wall than the first portion is from the cylinder wall. In this case, the oil return port allows communication between the cylinder-side face of the second portion and the inner space of the piston.

In the thus-constructed piston, a surplus of oil, which has reached the cylinder wall at a location on the side of the crank case with respect to the ring that is continuously formed of resin without being provided with an abutment and slides on the cylinder wall, is raked downwards by the first portion formed on the land portion, which is located on the side of the crank case with respect to the ring groove. The oil is then transported to the oil return port and introduced into the piston therethrough.

In addition to the features of the first aspect of the present invention, the present invention may further be specified according to a second aspect thereof. That is, the aforementioned piston ring structural body is composed of an outer ring continuously formed of a resinous material without being provided with an abutment, an inner ring continuously formed of a resinous material without being provided with an abutment, and a metal coil expander for pressing the inner ring radially outwards.

In the thus-constructed piston, a surplus of oil, which has reached the cylinder wall at a location on the side of the crank case with respect to the outer ring continuously formed of a resinous material without being provided with an abutment, is introduced into the piston through the oil return port formed through the land portion, which is located on the side of the crank case with respect to the ring groove.

In the second aspect of the present invention, the outer ring may be made of polyimide and the inner ring may be made of polytetrafluoroethylene.

In addition to the features of the first aspect of the present invention, the present invention may further be specified according to a third aspect thereof. That is, the aforementioned piston ring structural body is composed of an outer ring continuously formed of a resinous material without being provided with an abutment, an inner ring made of a metal material and provided with an abutment, and a metal coil expander for pressing the inner ring radially outwards.

In the thus-constructed piston, a surplus of oil, which has reached the cylinder wall at a location on the side of the crank case with respect to the outer ring continuously formed of a resinous material without being provided with an abutment, is introduced into the piston through the oil return port formed through the land portion, which is located on the side of the crank case with respect to the ring groove.

In the third aspect of the present invention, the outer ring may be made of polyimide and the inner ring may be made of steel.

In the aforementioned aspects of the present invention, the outer ring may have a sliding face that slides along the cylinder wall, and an upper edge portion of the sliding face may be provided with a chamfer.

In the thus-constructed piston, even if oil has flown into the space above the outer ring, the oil is likely to return to the space below the outer ring during an upward movement of the piston.

BRIEF DESCRIPTION OF THE DRAWINGS

The foregoing and further objects, features and advantages of the present invention will become apparent from the following description of preferred embodiments with reference to the accompanying drawing, wherein.

DETAILED DESCRIPTION OF THE PREFERRED EMBODIMENT

Figure 1:
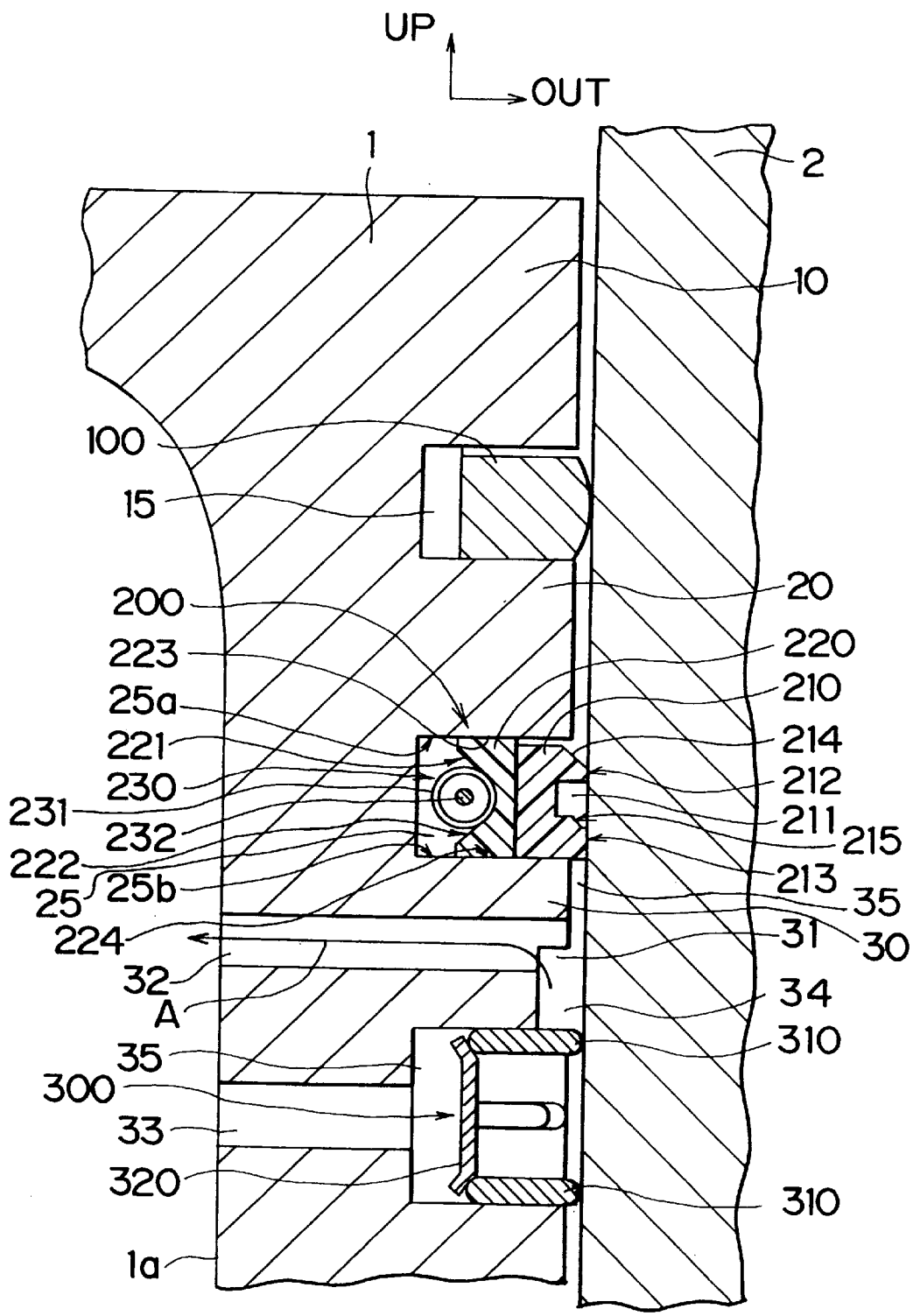
FIG. 1 is a partial cross-sectional view showing a piston according to one embodiment of the present invention.

An embodiment of the present invention will be described hereinafter with reference to the accompanying drawing.

FIG. 1 shows the structure of a piston according to one embodiment of the present invention. Referring to FIG. 1, a piston 1, which slides on an inner face of a cylinder wall 2, has a first land 10, a second land 20, a third land 30, a top ring groove 15, a second ring groove 25 and a third ring groove 35.

A top ring 100, a second ring 200 and an oil ring 300 are fitted into the top ring groove 15, the second ring groove 25 and the third ring groove 35 respectively.

It is to be noted in FIG. 1 that arrow UP indicates an upward direction of the piston 1 and that arrow OUT indicates a radially outward direction of the piston 1.

The top ring 100 is made of steel and provided with an abutment. The second ring 200 is of a type wherein an outer ring 210 continuously formed of resin without being provided with an abutment is pressed against the cylinder wall 2 by a coil expander 230 via an inner ring 220 also continuously formed of resin without being provided with an abutment.

In this embodiment, the resin used for the outer ring 210 has a coefficient of thermal expansion of $3 \times 10^{-5}$/K or less and a breaking point (a ratio of an elongation of a test piece that has been fracture to the original length thereof in a tensile test) of 10% (10% of the original length) or more. The resin used for the inner ring 220 is polytetrafluoroethylene (PTFE). The coefficient of thermal expansion and breaking point of PTFE are larger than those of polyimide, which is a material of the aforementioned outer ring 210.

A radially outside sliding face of the outer ring 210, which slides against the cylinder wall 2, is divided into upper and lower sliding faces 212, 213 by a groove 211 continuously extending in the outer circumferential direction. By thus dividing the sliding face into the upper and lower sliding faces 212, 213, the outer ring 210 can slide against the cylinder wall 2 in a stable posture, despite a relatively small radial width thereof.

Upper edge portions of the upper and lower sliding faces 212, 213 are provided with chamfers 214, 215 respectively.

The inner ring 220 has on an inner diameter-side thereof an upper inclined face 221 extending inwards and upwards and a lower inclined face 222 extending inwards and downwards. The angles of inclination of the upper and lower inclined faces 221, 222 are set such that the elastic force of the coil expander 230 is suitably distributed in the radial direction and in the top-to-bottom direction.

In a free state where the inner ring 220 is not fitted into the second ring groove 25 at room temperature, the height of the inner ring 220 in a piston-axis direction is set smaller than the height of the second ring groove 25 and substantially equal to the height of the outer ring 210.

However, the inner ring 220, which is made of PTFE, is susceptible to thermal expansion and deformation. Thus, when the engine is in operation at a high temperature, the inner ring 220 is pressed outwards due to an elastic force of the coil expander 230 via the aforementioned inclined faces. Then, the height of the inner ring 220 in the piston-axis direction increases, so that upper and lower faces 223, 224 of the inner ring 220 come into close contact with top and bottom faces 25a, 25b of the second ring groove 25 respectively. Consequently, the gas tending to flow along a wall surface of the second ring groove 25 is reliably sealed.

Because the inner ring 220 is susceptible to deformation, the coil expander 230 can effectively apply an elastic force to the outer ring 210, which is pressed against the cylinder wall 2. Thus, the outer ring 210 can maintain the sealability between itself and the cylinder wall 2.

The structure of the coil expander 230 will now be described. The coil expander 230 has a known structure wherein a steel coil 231, which is made by winding a steel wire like a coil, has a core member 232 passing therethrough and is bent into a circular shape along the core member 232. The coil expander 230 is disposed to be received between the aforementioned upper and lower inclined faces 221, 222 of the inner ring 220. By being thus received, the coil expander 230 becomes shorter. Accordingly, the coil expander 230 attempts to assume its free length and thereby generates such a force as to stretch out the inner ring 220.

As a feature of the present invention, the third land 30, which is located below the second ring groove 25 into which the aforementioned second ring 220 is fitted, has on the cylinder wall-side thereof a stepped portion 31, whose outer diameter is smaller than that of the third land 30. Oil spill ports 32, which extend from the stepped portion 31 and reach an inner wall 1a of the piston 1, are formed through the stepped portion 31. The stepped portion 31 defines an enlarged gap 34 between the third land 30 and the cylinder wall 2.

While the stepped portion 31 continuously extends along the circumference, the first oil spill ports 32 are arranged at equal intervals along the circumference.

The oil ring 300 will now be described. A typical ring of a known structure can be used as the oil ring 300. The oil ring 300 used in this embodiment is what is called an assembly type, which is composed of a third rail 310 and a spacer expander 320.

As is also known, oil spill ports 33 are formed to allow communication between the third ring groove 35 and the inner wall 1a of the piston 1.

Because this embodiment has such a construction, when the piston 1 falls, a surplus of oil that has adhered to the surface of the cylinder wall 2 is basically raked downwards by the oil ring 300 of a known type. Then, the thus-raked oil is introduced into the piston 1 through the oil spill ports 33 and returned to a crank case. However, the oil that has not been raked downwards by the oil ring 300 reaches the enlarged gap 34, which is defined by the stepped portion 31.

Without the oil spill ports 32, oil would flow from a gap 35 below the outer ring 210 of the second ring 200 into a space above the second ring 200 through a minute gap (not shown) between a lower sliding face 213 of the outer ring 210 and the cylinder wall 2, the groove 211, and a minute gap (not shown) between an upper sliding face 212 of the outer ring 210 and the cylinder wall 2. However, because the oil spill ports 32 are formed, the oil that has reached the aforementioned enlarged gap 34 is raked downwards by the stepped portion 31. As indicated by arrow A, the thus-raked oil is introduced into the piston 1 through the oil spill ports 32 and returned to the crank case. Consequently, it is possible to inhibit oil from flowing into the space above the second ring 200.

As described above, the upper and lower sliding faces 212, 213 of the outer ring 210 are provided with the chamfers 214, 215 respectively. Therefore, even if oil has flown into the space above the outer ring 210, the oil is likely to return to the space below the outer ring 210 during an upward movement of the piston.

In the aforementioned embodiment, even if a piston ring continuously formed of resin without being provided with an abutment is used, a stepped portion is formed on the land below the piston ring and the stepped portion communicates with the inside of the piston. Thus, the oil that has reached the space below the piston ring continuously formed of resin can flow into the piston. Consequently, the oil is prevented from entering a combustion chamber through the space between the resinous piston ring and the cylinder wall, whereby the amount of oil consumption is reduced.

While the present invention has been described with reference to what is presently considered to be a preferred embodiment thereof, it is to be understood that the present invention is not limited to the disclosed embodiment or construction. On the contrary, the present invention is intended to cover various modifications and equivalent arrangements. In addition, while the various elements of the disclosed invention are shown in various combinations and configurations, which are exemplary, other combinations and configurations, including more, less or only a single embodiment, are also within the spirit and scope of the present invention.

What is claimed is:

1. A piston comprising:
    a piston ring structural body including a ring that is continuously formed of resin without being provided with an abutment and slides against a cylinder wall;
    a ring groove into which said piston ring structural body is fitted; and
    a land portion that is formed on an outer circumference of said piston on a side of a crank case with respect to said ring groove and having at least a portion closer to said cylinder wall than a bottom portion of said ring groove,
    wherein said land portion has formed therethrough an oil return port that allows communication between a cylinder-side face of said land portion and an inner space defined by an inner wall of said piston,
    wherein said land portion defines an oil transportation mechanism that transports oil which has reached said land portion to said oil return port when said piston moves toward said crank case,
    wherein said oil transportation mechanism has a first portion that is formed on said land portion and located nearest to said cylinder wall and a second portion that is formed on a side of said crank case relative to said first portion of said land portion and located farther from said cylinder wall than said first portion is from said cylinder wall, and
    wherein said oil return port allows communication between the cylinder-side face of said second portion and the inner space piston.

2. The piston according to claim 1, wherein said oil transportation mechanism is formed on a land portion that is located immediately below a ring groove into which the piston ring structural body is fitted.

3. The piston according to claim 1, wherein said piston ring structural body comprises:
    an outer ring continuously formed of a resinous material without being provided with an abutment;
    an inner ring continuously formed of a resinous material without being provided with an abutment; and
    a metal coil expander for pressing said inner ring radially outwards.

4. The piston according to claim 3, wherein said outer ring is made of polyimide and said inner ring is made of polytetrafluoroethylene.

5. The piston according to claim 1, further comprising:
    a second ring groove formed below said land portion; and
    an oil ring fitted into said second ring groove,
    wherein a second oil return port leading to the inner space of the piston is formed through a bottom face of said second ring groove.

6. The piston according to claim 1,
    wherein said piston ring has a sliding face that slides along said cylinder wall, and
    wherein an upper edge portion of said sliding face is provided with a chamfer.

7. The piston according to claim 1, wherein said piston ring structural body includes:
    an outer ring continuously formed of a resinous material without being provided with an abutment;
    an inner ring made of metal material and provided with an abutment; and
    a metal coil expander for pressing said inner ring radially outwards.

8. The piston according to claim 7, wherein is made of polyimide and said inner ring is made of steel.

9. A piston comprising:
    a piston ring structural body including a ring that is continuously formed of resin without being provided with an abutment and slides against a cylinder wall, including:
    an outer ring continuously formed of a resinous material without being provided with an abutment;
    an inner ring continuously formed with resinous material without being provided with
    an abutment; and
    a metal coil expander for pressing said inner ring radially outwards;
    a ring groove into which said piston ring structural body is fitted; and
    a land portion that is formed on an outer circumference of said piston on a side of a crank case with respect to said ring groove and having at least a portion closer to said cylinder wall than a bottom portion of said ring groove, wherein said land portion has formed therethrough an oil return port that allows communication between a cylinder-side face of said land portion and an inner space defined by an inner wall of said piston, wherein said land portion defines an oil transportation mechanism that transports oil which has reached said land portion to said oil return port when said piston moves toward said crank case, wherein said outer ring is made of polyimide and said inner ring is made of polytetrafluoroethylene.

10. A piston comprising:

a piston ring structural body including a ring that is continuously formed of resin without being provided with an abutment and slides against a cylinder wall, including:

an outer ring made of a metal material and provided with an abutment;

an inner ring made of a metal material and provided with an abutment; and a metal coil expander for pressing said inner ring radially outwards;

a ring groove into which said piston ring structural body is fitted; and a land portion that is formed on an outer circumference of said piston on a side of a crank case with respect to said ring groove and having at least a portion closer to said cylinder wall than a bottom portion of said ring groove, wherein said land portion has formed therethrough an oil return port that allows communication between a cylinder-side face of said land portion and an inner space defined by an inner wall of said piston, wherein said land portion defines an oil transportation mechanism that transports oil which has reached said land portion to said oil return port when said piston moves toward said crank case.

11. The piston according to claim 10, wherein said outer ring is made of polyimide and said inner ring is made of steel.

* * * * *